(12) United States Patent
Frerichs et al.

(10) Patent No.: US 8,764,977 B2
(45) Date of Patent: Jul. 1, 2014

(54) SUMP FILTER RESTRAINING DEVICE

(75) Inventors: Todd A Frerichs, Waterford, MI (US); Michael P. Fannin, Brighton, MI (US); John A. Diemer, Farmington Hills, MI (US); Robert Neil Paciotti, White Lake, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 641 days.

(21) Appl. No.: 12/576,961

(22) Filed: Oct. 9, 2009

(65) Prior Publication Data

US 2011/0084015 A1 Apr. 14, 2011

(51) Int. Cl.
*B01D 29/03* (2006.01)
*F01M 1/10* (2006.01)
*F01M 11/03* (2006.01)

(52) U.S. Cl.
USPC ............... 210/172.4; 210/416.4; 210/167.08; 210/172.3

(58) Field of Classification Search
USPC ............. 210/167.01, 167.02, 167.08, 172.1, 210/172.2, 172.3, 172.4, 350, 351, 416.1, 210/416.2, 416.3, 416.4, 416.5, 488, 461, 210/483, 473, 349, 435, 167.03, 232, 455, 210/167.09; 123/1 A, 192.1, 196 A; 184/6.24; 267/169, 170, 174, 140.13
See application file for complete search history.

(56) References Cited

U.S. PATENT DOCUMENTS

| | | | | |
|---|---|---|---|---|
| 1,694,770 A | * | 12/1928 | Cram | 210/460 |
| 3,556,504 A | * | 1/1971 | Sinclair | 267/4 |
| 4,028,243 A | * | 6/1977 | Offer et al. | 210/130 |
| 5,292,432 A | * | 3/1994 | Jainek et al. | 210/232 |
| 6,582,593 B2 | * | 6/2003 | Wolford et al. | 210/130 |
| 6,626,329 B2 | * | 9/2003 | Rake et al. | 222/103 |
| 7,281,904 B2 | | 10/2007 | Schultz et al. | |
| 7,282,140 B2 | * | 10/2007 | Boast et al. | 210/130 |
| 7,331,771 B2 | | 2/2008 | Schultz et al. | |
| 2008/0028888 A1 | | 2/2008 | Lochocki, Jr. | |
| 2008/0290013 A1 | * | 11/2008 | Stausberg et al. | 210/167.04 |

* cited by examiner

*Primary Examiner* — Nam Nguyen
*Assistant Examiner* — Claire Norris

(57) ABSTRACT

A sump filter assembly for filtering hydraulic fluid supplied by a transmission sump includes a filter housing, a support member, a retainer member, and a biasing member. The filter housing has a top surface and a bottom surface, wherein the bottom surface opposes a bottom surface of the transmission sump. The support member includes a first end portion attached to the filter housing. The retainer member is slideably connected to the support member and includes a first end portion having a retaining surface, wherein the retaining surface opposes the top surface of the filter housing. The biasing member has a first end in contact with the retaining surface of the retainer member and a second end in contact with the top surface of the filter housing.

22 Claims, 2 Drawing Sheets

SUMP FILTER RESTRAINING DEVICE

TECHNICAL FIELD

The present invention relates to hydraulic fluid filter assemblies in transmission sumps, and more specifically to a restraining device for positioning a hydraulic fluid filter assembly relative to a transmission sump.

BACKGROUND

The statements in this section merely provide background information related to the present invention and may or may not constitute prior art.

A typical automatic transmission includes an electronically controlled hydraulic control circuit or system that uses a hydraulic fluid to actuate torque transmitting mechanisms, as well as to lubricate and cool the transmission. The hydraulic fluid is typically stored in a fluid reservoir, or sump, located at a bottom of the transmission. A pump connected to the sump is used to draw the hydraulic fluid from the sump and communicate the hydraulic fluid throughout the hydraulic control system.

In order to prevent damage to the control system due to unwanted contaminants that may be present in the hydraulic fluid, a filter is generally disposed in the sump and is connected to the pump. The filter includes a filter element surrounded by a filter body having an inlet for incoming hydraulic fluid and an outlet for outgoing hydraulic fluid. The filter removes the contaminants from the hydraulic fluid prior to entering the pump.

However, it is desirable that the volume of hydraulic fluid in the sump be large enough so that the filter inlet for incoming fluid is submerged in the hydraulic fluid in order to prevent air from being drawn into the filter, thus leading to air entrainment within the hydraulic fluid. Entrained air within the hydraulic fluid, in turn, reduces the control, cooling, and lubrication effectiveness of the hydraulic fluid.

Existing sump filter designs and manufacturing tolerances may lead to the filter body and filter inlet to move up and away from the bottom of the sump. The accumulated system manufacturing tolerances at the filter inlet may be, for example, on the order of 7-8 mm. As a result, the volume of hydraulic fluid stored in the sump must by increased by a corresponding amount to prevent the filter inlet from lifting out of the hydraulic fluid due to manufacturing tolerances and therefore drawing air into the filter. However, this increased volume of hydraulic fluid adds to the vehicle mass, cost, and packaging, and increases the burdens of transmission hydraulic fluid management on the system. These consequences of additional hydraulic fluid volume also negatively affect vehicle acceleration, braking, and maneuverability. Accordingly, there is a need for a transmission sump filter assembly that reduces movement of the filter inlet opening due to manufacturing tolerances in order to minimize the volume of hydraulic fluid within the sump.

SUMMARY

In an example of the present invention, a sump filter assembly for filtering hydraulic fluid supplied by a transmission sump is provided. The sump filter assembly includes a filter housing, a support member, a retainer member, and a biasing member. The filter housing has a top surface and a bottom surface, wherein the bottom surface opposes a bottom surface of the transmission sump, and wherein the bottom surface of the filter housing includes a filter inlet and the top surface of the filter housing includes a filter outlet. The support member includes a first end portion attached to the filter housing. The retainer member is slideably connected to the support member and includes a first end portion having a retaining surface, wherein the retaining surface opposes the top surface of the filter housing. The biasing member has a first end in contact with the retaining surface of the retainer member and a second end in contact with the top surface of the filter housing. The biasing member biases the filter housing towards the bottom surface of the transmission sump.

In another example of the present invention, the biasing member produces a biasing force on the filter housing, wherein the biasing force is predetermined to keep the filter inlet of the bottom surface of the filter housing within a predetermined distance of the bottom surface of the transmission sump under normal operating conditions.

In yet another example of the present invention, the biasing member is preloaded to bias the filter housing against the surface of the transmission sump.

In yet another example of the present invention, the support member is shaped substantially as a cylindrical shell extending away from the top surface of the filter housing.

In yet another example of the present invention, the support member is formed into the filter housing.

In yet another example of the present invention, the retainer member further includes an intermediate portion and a second end portion, wherein the intermediate portion includes an intermediate aperture and the second end portion includes a first aperture.

In yet another example of the present invention, the support member further includes an intermediate portion and a second end portion, wherein the second end portion includes an interference portion disposed within the intermediate aperture of the retainer member, and wherein the intermediate portion of the support member is at least partially disposed within the first aperture of the support member, and wherein the interference portion of the support member has a diameter that is larger than a diameter of the first aperture of the second end portion of the retainer member to prevent the retainer member from disengaging from the support member.

In yet another example of the present invention, the retainer member is attached to a transmission housing of the vehicle transmission.

In yet another example of the present invention, the retainer member is attached to a hydraulic pump of the vehicle transmission.

In yet another example of the present invention, the resilient member is a coil spring circumscribing the support member, the intermediate portion of the retainer member, and the first end portion of the retainer member.

In yet another example of the present invention, the top surface of the filter housing further includes a ridge that encloses a receiving portion, and the resilient member contacts the receiving portion of the top surface of the filter housing.

In yet another example of the present invention, the filter housing is a plastic material.

In yet another example of the present invention, a sump filter assembly for filtering hydraulic fluid supplied by a transmission sump is provided. The sump filter assembly includes a plastic housing, a retainer member, a support member, and a biasing member. The plastic filter housing has a top surface and a bottom surface, wherein the bottom surface opposes a bottom surface of the transmission sump, and wherein the bottom surface of the plastic filter housing includes a filter inlet and the top surface of the plastic filter housing includes a filter outlet. The retainer member includes an intermediate portion, a first end portion, and a second end portion, wherein the first end portion includes a retaining surface that opposes the top surface of the plastic filter housing, and wherein the intermediate portion includes an intermediate aperture and the first end portion includes a first aperture. The support member is formed into the plastic filter housing and includes a first end portion, a second end portion, and an intermediate portion disposed between the first and second end portions, wherein the support member is shaped substantially as a cylindrical shell extending away from the top surface of the filter housing, wherein the first end portion is attached to the plastic filter housing, wherein the second end portion includes an interference portion disposed within the intermediate aperture of the retainer member, and wherein the intermediate portion of the support member is at least partially disposed within the first aperture of the support member. The biasing member has a first end in contact with the retaining surface of the retainer member and a second end in contact with the top surface of the plastic filter housing. The interference portion of the support member has a diameter that is larger than a diameter of the first aperture of the first end portion of the retainer member, and the biasing member biases the plastic filter housing towards the bottom surface of the transmission sump.

In yet another example of the present invention, the biasing member produces a biasing force on the filter housing, and the biasing force is predetermined to keep the filter inlet of the bottom surface of the filter housing within a predetermined distance of the bottom surface of the transmission sump under normal operating conditions.

In yet another example of the present invention, the biasing member is preloaded to bias the filter housing against the surface of the transmission sump.

In yet another example of the present invention, the filter outlet is pressed into a hydraulic pump, wherein the biasing member is preloaded with a predetermined force selected to overcome a suction force between the filter outlet and the pump.

In yet another example of the present invention, the retainer member is biased against a transmission housing of the vehicle transmission.

In yet another example of the present invention, the retainer member is connected to a hydraulic pump of the vehicle transmission.

In yet another example of the present invention, the top surface of the filter housing further includes a ridge that encloses a receiving portion, and the resilient member contacts the receiving portion of the top surface of the filter housing.

In yet another example of the present invention, the resilient member is a coil spring that circumscribes the support member and at least part of the receiving member.

Further examples, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION OF THE PREFERRED EMBODIMENTS

Figure 1:
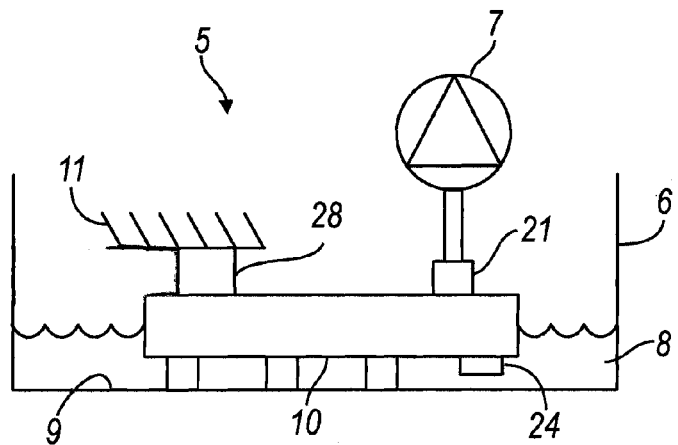
FIG. 1 is a schematic view of a sump filter assembly in a sump of a transmission in accordance with an embodiment of the present invention.

With reference to FIG. 1, a portion of an exemplary hydraulic control system according to the principles of the present invention is generally indicated by reference number 5. The portion of the hydraulic control system 5 shown includes a sump pan 6 in fluid communication with a pump 7. The sump pan 6 is a fluid reservoir typically located at a bottom of the transmission used for storing a hydraulic fluid 8. The sump pan 6 generally includes a bottom surface 9. The pump 7 is operable to draw or suck the hydraulic fluid 8 from the sump pan 6 and communicate the hydraulic fluid 8 under pressure throughout the transmission, as required. The pump 7 is driven by a prime mover, such as a combustion engine, electric engine, or hybrid plant. It should be appreciated that the pump 7 may be any positive displacement pump without departing from the scope of the present invention. A filter assembly 10 according to the principles of the present invention is disposed within the sump pan 6 between the sump pan 6 and the pump 7. The filter assembly 10 is connected to a fixed flange, member, or other housing component 11, as will be described in detail below. The filter assembly 10 is operable to filter the hydraulic fluid 8 as the hydraulic fluid 8 leaves the sump pan 6 prior to entering the pump 7. While the hydraulic control system 5 described herein is preferably used in an automatic multi-speed power transmission (not shown) of an automobile (not shown), it should be appreciated that the hydraulic control system 5 may also be applied in other various applications. For example, the hydraulic control system 5 may be employed in aeronautical vehicles (e.g., airplanes, helicopters, etc.), agricultural vehicles (e.g., combine, tractor, etc.), construction vehicles (e.g., forklift, backhoe, excavator, etc.), and stationary machines (e.g., hydraulic press, hydraulic drill, etc.).

Figure 2:
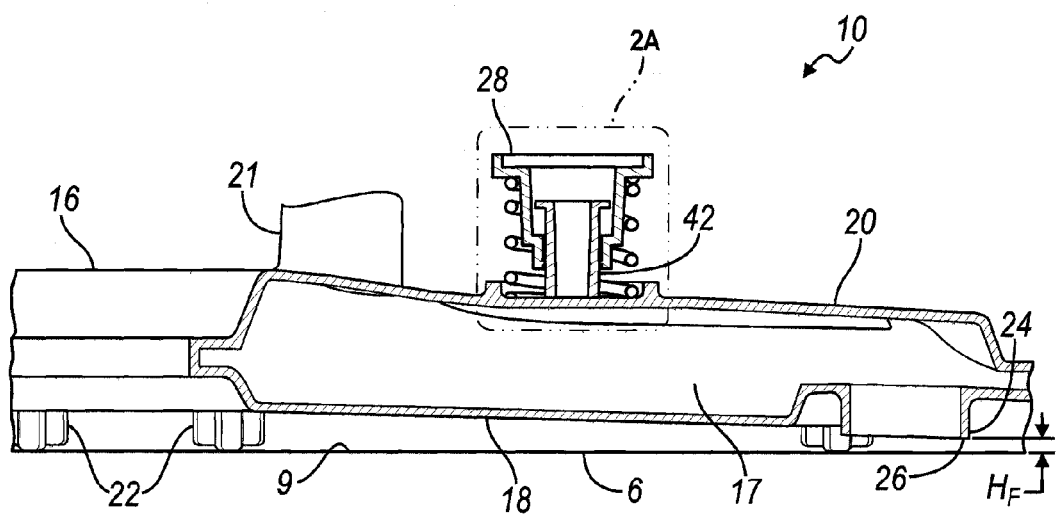
FIG. 2 is a cross-sectional view of a sump filter assembly in accordance with an embodiment of the present invention.
Figure 2A:
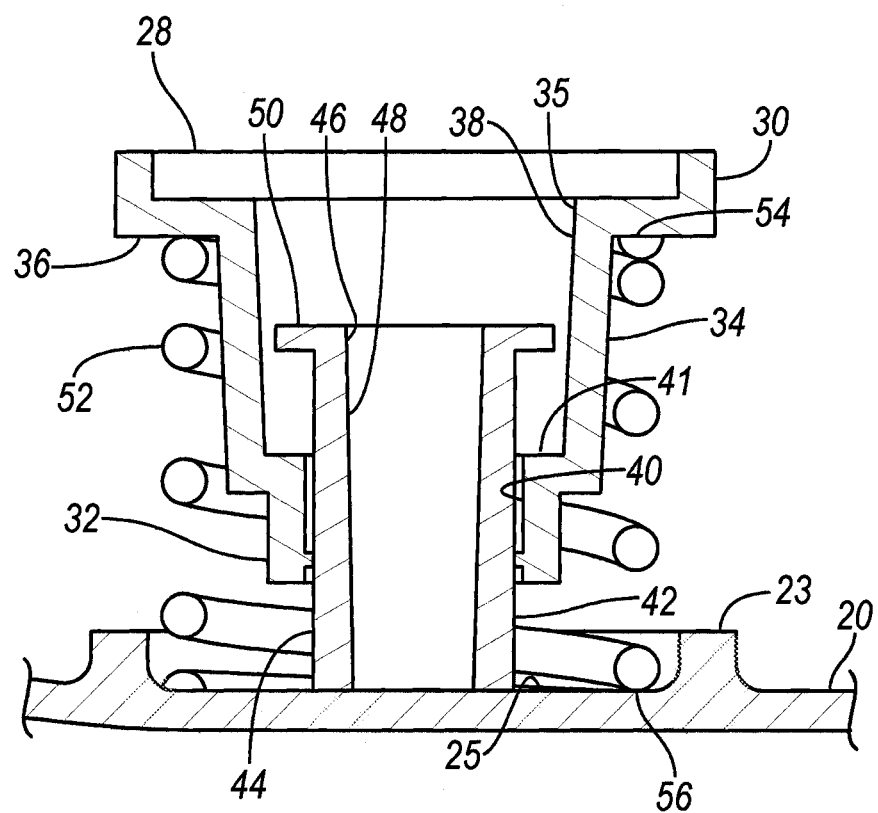
FIG. 2A is an expanded cross-sectional view of a portion of the sump filter assembly of FIG. 2.

Referring now to FIGS. 2 and 2A and with continued reference to FIG. 1, the filter assembly 10 includes a filter housing 16 that defines a cavity 17 that generally contains one or more filter elements (not shown) to trap particles or other contaminants that may be present in the hydraulic fluid 8. In the example provided, the filter housing 16 is injection molded plastic. However, the filter housing 16 may be a different material or may be made from a different manufacturing process without departing from the scope of the present invention. The filter housing 16 has a bottom surface 18 and a top surface 20. The top surface 20 includes a filter outlet 21 that communicates with the cavity 17. In the example provided, the filter outlet 21 is press fit into an inlet port (not shown) of the pump 7. The top surface also includes a raised ridge portion 23 that defines a retaining portion 25, as best seen in FIG. 2A. The bottom surface 18 opposes the bottom surface 9 of the sump 6 and includes a plurality of supports 22. The supports 22 extend from the bottom surface 18 of the filter housing 16 towards the bottom surface 9 of the sump 6.

The bottom surface 18 of the filter housing 16 includes a filter inlet 24. The filter inlet 24 has an inlet end portion 26 that defines where the hydraulic fluid 8 enters the filter assembly 10. In the example provided, the filter inlet 24 extends away from the bottom surface 18 of the filter housing 16 to the sump 8 in the direction of the bottom surface 9. The inlet end portion 26 of the filter inlet 24 is a distance $H_F$ away from the bottom surface 9 of the sump. The distance $H_F$ should be below the surface of the hydraulic fluid 8 within the sump 6 during operation in order to avoid taking air into the filter housing 16.

The filter assembly 10 further includes a cylindrically shaped retainer member 28, best seen in FIG. 2A. The retainer member 28 includes a first end portion 30, a second end portion 32, and an intermediate portion 34 disposed between the first end portion 30 and the second end portion 32. The portions 30, 32, and 34 define an inner cavity 35. The first end portion 30 presses against or is spring loaded against the fixed housing component 11. The first end portion 30 includes a retaining surface 36 on an outside of the retainer member 28 that opposes the top surface 20 of the filter housing 16. The intermediate portion 34 defines an intermediate section 38 of the cavity 35 within the retainer member 28. The intermediate section 38 has a lateral dimension as measured from an axis of the retainer member 28 to a surface of the retainer member 28 adjacent to the intermediate section 38 of the cavity 35. The second end portion 32 defines an end section 40 of the cavity 35. The section 40 has a lateral dimension, as measured from the axis of the retainer member 28 to a surface of the retainer member 28 adjacent to the section 40 of the cavity 35, that is smaller than the lateral dimension of the intermediate section 38. In the example provided, the lateral dimensions are the radii of the sections 38, 40 of the cavity 35. The interface or transition between the intermediate section 38 and the section 40 defines a step surface 41 located within the cavity 35. It should be appreciated that the retainer member 28 may have other shapes without departing from the scope of the present invention.

The filter assembly 10 further includes a support member 42. The support member 42 includes a first end portion 44, a second end portion 46, and an intermediate portion 48 disposed between the first end portion 44 and the second end portion 46. The support member 42 extends away from the top surface 20 of the filter housing 16. The first end portion 44 is attached to the top surface 20 of the filter housing 16. In the example provided, the support member 42 is a plastic cylindrical post and is injection molded as an integral part of the filter housing 16.

In order to load the filter housing 16 against the fixed housing component 11, the support member 42 is at least partially disposed within the retaining member 28. In the example provided, the intermediate portion 48 of the support member 42 is at least partially disposed in the end section 40 of the retainer member 28. The retainer member 28 is capable of moving in an axial direction relative to the support member 42. In addition, the cylindrical shape of the support member 42 permits the support member 42 to rotate relative to the retainer member 28 without transferring torque between the members 28, 42. However, the support member 42 may take other shapes without departing from the scope of the present invention so long as the support member 42 and the retainer member 28 are capable of independent movement in an axial direction relative to one another.

The second end portion 46 of the support member 42 includes an interference portion 50 disposed within the intermediate section 38 of the retainer member 28 to prevent the retainer member 28 from completely separating from the support member 42 during relative movement between the retainer member 28 and the support member 42. The intermediate portion 48 has a lateral dimension that is smaller than a lateral dimension of the interference portion 50. Accordingly, during relative movement between the retainer member 28 and the support member 42 in an axial direction, the interference portion 50 contacts the step 41 of the support member 28, thereby preventing further axial movement. In the example provided, the interference portion 50 is a radially extending flange formed by spin welding or sonic welding the top of the support member 42 after the support member 42 has been placed within the retaining member 28. In alternative embodiments, the interference portion 50 may be replaced by other means of preventing the retaining member 28 from separating from the support member 42, such as by using fasteners such as screws, washers and screws, or by heat staking or using locking tabs.

A biasing member 52 is disposed between the retaining member 28 and the top surface 20 of the filter housing 16. The biasing member 52 has a first end 54 in contact with the retaining surface 36 of the retainer member 28 and a second end 56 in contact with the retaining portion 25 of the top surface 20 of the filter housing 16. In the example provided, the biasing member 52 is a coil spring circumscribing the support member 42 and the intermediate portions 32, 34 of the retainer member 28. The biasing member 52 is placed around the support member 42 so that the second end 56 of the biasing member 42 is captured or retained within the raised ridge portion 23 of the filter housing 16. In alternative embodiments, the biasing member 52 may be a different type of resilient member and may be disposed in other locations. In the example provided, the biasing member 52 is pre-loaded with a predetermined force by the assembly of the retainer member 28 over the support member 42. The predetermined force is selected to be greater than a suction force between the pump 7 and the filter outlet 21. In alternative embodiments, the biasing member is not pre-loaded or is pre-loaded by alternate means, such as loading the spring to itself or to an additional component.

During assembly and operation, the transmission may be acted on by forces that tend to create relative movement between the sump 6 and the fixed component 11. As the fixed component 11 moves, so too does the retaining member 28 move relative to the filter housing 16. As the retaining member 28 moves relative to the support member 42, the biasing member 52 exerts a downward force on the filter housing 16 that varies with the distance between the retaining member 28 and the filter housing 16. As the biasing member 52 tries to decompress, the retaining surface 36 of the retainer member 28 provides a resistance force to the biasing member 52. The biasing member 52 transmits the resistance force to the retaining portion 25 of the top surface 20 of the filter housing 16. The filter housing 16 is substantially rigid, and transfers the resistance force to the supports 22. Preferably the resistance force is large enough to keep the supports 22 biased against and in contact with the bottom surface 9 of the sump during normal operating conditions of the vehicle in which the filter assembly 10 is employed. If the supports 22 are not biased against the surface 9 after assembly or during operation, the preselected force from preloading the biasing member 52 will overcome the suction force between the filter outlet 21 and the pump 7 and position the supports 22 against the surface 9. Normal operating conditions may include the anticipated or worst case loads, vibrations, and accelerations the vehicle is designed to be capable of withstanding. The substantially rigid filter housing 16 also reduces the separation between the end portion 26 of the filter inlet 24 and the bottom surface 9 of the filter housing 16. Accordingly, the minimum hydraulic fill level $H_F$ is maintained for assembly stack variation and even during movement of the fixed component 11 relative to the sump 6. By maintaining a minimum $H_F$ value, the amount of hydraulic fluid 8 needed within the sump 6 is minimized.

The description of the invention is merely exemplary in nature and variations that do not depart from the gist of the invention are intended to be within the scope of the invention. Such variations are not to be regarded as a departure from the spirit and scope of the invention.

What is claimed is:

1. A sump filter assembly for filtering hydraulic fluid supplied by a transmission sump, the sump filter assembly comprising:
   a filter housing having a top outer surface and a bottom surface, wherein the bottom surface opposes a bottom surface of the transmission sump, and wherein the bottom surface of the filter housing includes a filter inlet and a plurality of supports and the top outer surface of the filter housing includes a filter outlet in fluid communication with a pump of the transmission;
   a support member including a first end portion attached to the filter housing;
   a retainer member slideably connected to the support member and including a first end portion having a retaining surface, wherein the retaining surface opposes the top outer surface of the filter housing; and
   a biasing member having a first end in contact with the retaining surface of the retainer member and a second end in contact with the top outer surface of the filter housing, and
   wherein the biasing member is preloaded.

2. The sump filter assembly of claim 1, wherein the biasing member produces a biasing force on the filter housing, and wherein the biasing force is predetermined to keep the filter inlet of the bottom surface of the filter housing within a predetermined distance of the bottom surface of the transmission sump under normal operating conditions.

3. The sump filter assembly of claim 1, wherein the support member is shaped substantially as a cylindrical shell extending away from the top outer surface of the filter housing.

4. The sump filter assembly of claim 3, wherein the support member is formed into the filter housing.

5. The sump filter assembly of claim 3, wherein the retainer member further includes an intermediate portion and a second end portion, and wherein the intermediate portion includes an intermediate aperture and the second end portion includes a first aperture.

6. The sump filter assembly of claim 5, wherein the support member further includes an intermediate portion and a second end portion, wherein the second end portion includes an interference portion disposed within the intermediate section of the retainer member, and wherein the intermediate portion of the support member is at least partially disposed within the end section of the second end portion, and wherein the interference portion of the support member has a diameter that is larger than a diameter of the end section of the second end portion of the retainer member to prevent the retainer member from disengaging from the support member.

7. The sump filter assembly of claim 1, wherein the retainer member is attached to a transmission housing of the vehicle transmission.

8. The sump filter assembly of claim 1, wherein the retainer member is attached to the pump of the transmission.

9. The sump filter assembly of claim 1, wherein the biasing member is a coil spring circumscribing the support member, the intermediate portion of the biasing member, and the first end portion of the retainer member.

10. The sump filter assembly of claim 9, wherein the top outer surface of the filter housing further includes a ridge that encloses a receiving portion, and wherein the biasing member contacts the receiving portion of the top surface of the filter housing.

11. The sump filter assembly of claim 1, wherein the filter housing is a plastic material.

12. A sump filter assembly connected between a fixed component and a transmission sump, the transmission sump having a bottom surface, the sump filter assembly comprising:
   a retainer member that defines a cavity and includes a section within the cavity having a dimension, the retainer member having a retaining surface, a first end connected to the fixed component, and a second end that defines an opening in communication with the cavity;
   a filter housing having:
      a top outer surface having an outlet in fluid communication with a pump;
      a bottom surface having an inlet and a plurality of supports, wherein the bottom surface is disposed opposite the bottom surface of the transmission sump; and
      a support member having a first end connected to the top outer surface and a second end, wherein the second end includes an interference portion having a dimension, and wherein the second end is disposed within the cavity of the retainer member;
   a biasing member having a first end in contact with the retaining surface of the retainer member and a second end in contact with the top surface of the filter housing, and
   wherein the dimension of the interference portion of the support member is larger than the dimension of the second end of the retainer member, and wherein the biasing member is preloaded.

13. The sump filter assembly of claim 12, wherein the biasing member produces a biasing force on the filter housing, and wherein the biasing force is predetermined to keep the filter inlet of the bottom surface of the filter housing within a predetermined distance of the bottom surface of the transmission sump under normal operating conditions.

14. The sump filter assembly of claim 12, wherein the dimension of the section within the cavity of the retainer member is a radius that is perpendicular to an axis of the retainer member, and wherein the dimension of the interference portion of the support member is a radius that is perpendicular to an axis of the support member.

15. The sump filter assembly of claim 12, wherein the interference portion of the support member has a step surface, and wherein the step surface of the support member contacts the retaining surface of the retainer member when the sump filter assembly is in a first position.

16. The sump filter assembly of claim 12, wherein the biasing member is preloaded to bias the filter housing against the surface of the transmission sump.

17. The sump filter assembly of claim 12, wherein the filter outlet is pressed into a hydraulic pump and the biasing member is preloaded with a predetermined force selected to overcome a suction force between the filter inlet and the pump.

18. The sump filter assembly of claim 12, wherein the retainer member is biased against a transmission housing of the vehicle transmission.

19. The sump filter assembly of claim 12, wherein the retainer member is connected to a hydraulic pump of the vehicle transmission.

20. The sump filter assembly of claim 12, wherein the top outer surface of the filter housing further includes a ridge that encloses a receiving portion, and wherein the biasing member contacts the receiving portion of the top surface of the filter housing.

21. The sump filter assembly of claim 15, wherein the biasing member is a coil spring that circumscribes the support member and at least part of the receiving member.

22. A sump filter assembly for filtering hydraulic fluid supplied by a transmission sump, the sump filter assembly comprising:
- a plastic filter housing having a top surface and a bottom surface, wherein the bottom surface opposes a bottom surface of the transmission sump, and wherein the bottom surface of the plastic filter housing includes a filter inlet and a plurality of supports and the top surface of the plastic filter housing includes a filter outlet in fluid communication with a hydraulic pump;
- a retainer member including an intermediate portion, a first end portion, and a second end portion, wherein the first end portion includes a retaining surface that opposes the top outer surface of the plastic filter housing;
- a support member formed into the plastic filter housing and including a first end portion, a second end portion, and an intermediate portion disposed between the first and second end portions, wherein the support member is shaped substantially as a cylindrical shell extending away from the top surface of the filter housing, wherein the first end portion is attached to the plastic filter housing, wherein the second end portion includes an interference portion disposed within the intermediate section of the retainer member, and wherein the intermediate portion of the support member is at least partially disposed within the end section of the second end portion; and
- a biasing member having a first end in contact with the retaining surface of the retainer member and a second end in contact with the top surface of the plastic filter housing, and
- wherein the interference portion of the support member has a diameter that is larger than a diameter of the end section of the second end portion of the retainer member, the intermediate section functions to maintain axial alignment of the support member with the retainer member to prevent a seized condition, and wherein the biasing member is preloaded, biases the plastic filter housing towards the bottom surface of the transmission sump, produces a biasing force on the filter housing wherein the biasing force is greater than a suction force of the hydraulic fluid pump, and the plurality of supports of the bottom surface contact the bottom surface of the sump.

* * * * *